US008019647B1

(12) United States Patent
Gidwani et al.

(10) Patent No.: US 8,019,647 B1

(45) Date of Patent: Sep. 13, 2011

(54) METHODS, APPARATUS AND COMPUTER READABLE MEDIUM FOR PROCESSING ORDER RELATED MESSAGES

(75) Inventors: Arvind D. Gidwani, Sunnyvale, CA (US); Subramanian Srinivasan, Fremont, CA (US); Dharmesh Parikh, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 1202 days.

(21) Appl. No.: 11/725,847

(22) Filed: Mar. 20, 2007

Related U.S. Application Data

(63) Continuation of application No. 09/811,971, filed on Mar. 19, 2001, now Pat. No. 7,203,658.

(51) Int. Cl.
*G06F 30/00* (2006.01)

(52) U.S. Cl. ........................... 705/26; 715/513; 715/516

(58) Field of Classification Search .................... 705/26, 705/27; 715/513, 516
See application file for complete search history.

(56) References Cited

U.S. PATENT DOCUMENTS 6,009,405 A * 12/1999 Leymann et al. ................. 705/9
6,125,391 A * 9/2000 Meltzer et al. ................ 709/223
6,499,036 B1 * 12/2002 Gurevich ...................... 707/778
6,658,483 B1 * 12/2003 Iwamoto et al. .............. 709/246
2002/0116205 A1 * 8/2002 Ankireddipally et al. ........ 705/1

OTHER PUBLICATIONS

Apicella et al, "Integrated information support system, vol. V—Common data model subsystem part 22—NDML (Neutral Data Manipulation Language) Precompiler Generate Conceptual Schema to External Schema Transform Product Specification", Wright Research and Development Center, dated Sep. 1990.*

* cited by examiner

*Primary Examiner* — Mark Fadok

(74) *Attorney, Agent, or Firm* — Hickman Palermo Truong & Becker LLP

(57) ABSTRACT

The invention is directed to techniques for processing order messages exchanged between a client and an order server. The order messages can be for products and services that the customer orders from a vendor. The client provides the input order messages, which contain order commands in a predefined document format, to an order message manager of the order server, which also provides an order message sorter and message processing modules. The order message sorter reads the input document in the input order message to determine a type for the message and then directs the message to a message processing module capable of processing that type of order message. The message processing module processes the input document, obtains data if needed from an order database, and prepares an output document to include in an output order message to be returned to the client.

21 Claims, 12 Drawing Sheets

330-1

```
<?xml version="1.0" encoding="UTF-8"?>
<!DOCTYPE AbcXML SYSTEM "http://www.abc-
company.com/xxx/AbcXML/1.0/AbcXML.dtd">
<AbcXML>
        <Header>
        <From>
                <Identity domain="XYZ">
                        <XYZ>000000003</XYZ>
                </Identity>
        </From>
        <To>
                <Identity domain="XYZ">
                        <XYZ>000000001</XYZ>
                </Identity>
      </To>
        </Header>
```

```
<CLASS>
        <Product>    2500 SOFTWARE   </Product>
        <Hash> 144615874 </Hash>
        <FullPath> ABC2501:2500</FullPath>
        <Description> SOFTWARE        2500 IOS Software</Description>

        <MINORCLASS>
                <Product>    ENT SW 25XX        </Product>
                <Hash> 245635088 </Hash>
                <FullPath> ABC2501:2500 SOFTWARE:ENT SW 25XX       </FullPath>
                <Description> SF25A - ENTERPRISE SOFTWARE </Description>

                <ITEM>
                <Product>    SF25A-11.2.20       </Product>
                <Hash> 161251304 </Hash>
                <FullPath> ABC2501:2500 SOFTWARE:ENT SW 25XX:SF25A-11.2.20 </FullPath>
                <Description> Abc IOS 2500 Series ENTERPRISE SF25A-11.2.20 </Description>
                </ITEM>

                <ITEM>
                <Product>SF25A-11.2.21</Product>
                <Hash> 163283137 </Hash>
                <FullPath> ABC2501:2500 SOFTWARE:ENT SW 25XX:SF25A-11.2.21 </FullPath>
                <Description>Abc IOS 2500 Series ENTERPRISE SF25a-11.2.21</Description>
                </ITEM>
        </MINORCLASS>
```

```
<MINORCLASS>
        <Product>    ENT/F+IPSEC56 25XX      </Product>
        <Hash> 245635089 </Hash>
        <FullPath> ABC2501:2500 SOFTWARE:ENT/F+IPSEC56 25XX     </FullPath>
        <Description> Abc 2500 Series IOS- ENTERPRISE/FW PLUS IPSEC 56 </Description>
```

370

```
        <ITEM>
        <Product>    S25AHL-12.0.9       </Product>
        <Hash> 163586257 </Hash>
        <FullPath> ABC2501:2500 SOFTWARE:ENT/F+IPSEC56 25XX:S25AHL-12.0.9
        </FullPath>
        <Description> Abc 2500 Series IOS ENTERPRISE/FW PLUS IPSEC 56  S25AHL-12.0.9
        </Description>
        </ITEM>
```

372

```
        <ITEM>
        <Product>S25AHL-12.0.10</Product>
        <Hash> 163705015 </Hash>
        <FullPath> ABC2501:2500 SOFTWARE: ENT/F+IPSEC56 25XX:SF25AHL-12.0.10
         </FullPath>
        <Description> Abc 2500 Series IOS ENTERPRISE/FW PLUS IPSEC 56  SF25A-12.0.10
        </Description>
        </ITEM>
    </MINORCLASS>
</CLASS>
```

FIG. 7D 330-5

```
374  <CLASS>
         <Product>    C25K ROUTER DOCS      </Product>
         <Hash> 163008415 </Hash>
         <FullPath> ABC2501:C25K ROUTER DOCS    </FullPath>
         <Description> DOCUMENTATION  </Description>
     </CLASS>

376  <CLASS>
         <Product>C25K RACK MOUNT </Product>
         <Hash> 163223347 </Hash>
         <FullPath> ABC2501:C25K RACK MOUNT </FullPath>
         <Description> RACK MOUNT KITS</Description>
             <ITEM>
             <Product>ACS-2500RM-24</Product>
             <Hash> 107011873 </Hash>
             <FullPath>ABC2501:C25K RACK MOUNT:ACS-2500RM-24</FullPath>
             <Description>RACK-MOUNT KIT , 24 INCHES</Description>
             </ITEM>
             <ITEM>
             <Product>    CAB-ACI      </Product>
             <Hash> 71707034 </Hash>
             <FullPath> ABC2501:POWER CABLES:CAB-ACI </FullPath>
             <Description> Power Cord-Italian</Description>
             </ITEM>
     </CLASS>
     </Response>
     </PayLoad>
</AbcXML>
```

FIG. 7E

METHODS, APPARATUS AND COMPUTER READABLE MEDIUM FOR PROCESSING ORDER RELATED MESSAGES

CROSS REFERENCE TO RELATED APPLICATIONS

This application is a Continuing Application under 37 CFR §1.53(b), and accordingly Applicant hereby claims the benefit under 35 U.S.C. §120 of U.S. patent application Ser. No. 09/811,971, filed Mar. 19, 2001 now U.S. Pat. No. 7,203,658, entitled METHODS AND APPARATUS FOR PROCESSING ORDER RELATED MESSAGES, incorporated herein by reference.

BACKGROUND OF THE INVENTION

In general, customers using an online order processing system may order products using a local computer (e.g., a client) over a connection to a vendor, such as by dialing in over a modem to a computer network, such as the Internet, to the vendor's computer (e.g., server). Typically, the customer can enter in ordering information into a user interface provided by the vendor's order processing software over the connection which is displayed on a visual display of the customer's computer. For example, the customer can begin by entering in the customer's name and address if the customer is interested in a particular product, and the customer can enter in the name and/or model number of the product that the customer is considering ordering. The customer can then receive product information including pricing information, configuration information, and so on.

After receiving this product information over the network connection, the customer can decide whether to place the order or to hold off submitting the order until a later time. If placing the order, the customer can indicate that the customer wishes to submit the order by further manipulating the computer display provided by the vendor's computer. The vendor's order processing software may require the customer to submit additional information, such as a purchase order number and shipping address. After entering this information, the order processing software processes this information and accepts (or rejects) the order. If the order is accepted, the vendor's computer indicates the acceptance and typically provides the customer with verification information, such as a confirmation number or order number, that the customer writes down on a piece of paper or prints out on a printer connected to the customers' local client computer.

If the customer is not sure of the product to be ordered, the customer can request information from the vendor's order processing software, which is then displayed on the customer's client computer as one or more screens of information provided over the network connection by the order processing software. The customer can then read through the displayed screens, or print them out to read the hard copies of the information for comparison with the customer's requirements and needs. If the customer is a business (e.g., wholesaler, distributor, value added reseller or VAR, original equipment manufacturer or OEM, or other business), then the customer can check or compare its own inventory, requests from its customers (e.g., its retail customers) and other information against the information provided by the vendor's computer to determine what products and configurations of those products to order from the vendor. In addition, the customer can use the ordering information (from a display screen or printout) and then enter (e.g., type in at a keyboard or copy and paste using a mouse) this information into an ordering application or other application (e.g., customer's inventory application) that the customer maintains at its own local computer.

In another conventional approach, a customer can log onto a vendor's web site over the Internet, and view information about products for sale at the web site provided by the vendor's order processing software from the vendor's web server. The customer can select products from displays on the web site for an order and can then submit the order through the web site. The web site then displays a confirmation number to the customer, who can print it out if desired.

SUMMARY OF THE INVENTION

The conventional approaches to the operation of order processing software over a network as described above have a number of deficiencies. After submitting the order, the customer can obtain information, such as a confirmation number, about the order, but then must typically re-enter the confirmation number and order information into the customer's own ordering application and local order database on the customer's computer. That is, the customer must enter the order information twice, once when entering the order information into the vendor's order application (e.g., provide order information in the vendor's web page), and a second time when entering the information into the customer's own order application and local order database (referred to as a double entry problem). The customer may be able to copy text from the vendor's order application (e.g., copy a confirmation number from a web page) and then paste the text into an input display for the customer's application, but this approach involves a manual operation of copying and pasting for each piece of information to be input into the customer's application.

In general, the customer cannot directly read in the data provided by the vendor's order processing software into the customer's ordering application. In particular, this is a problem if the customer is a large VAR or OEM, who orders products and parts from the vendor to incorporate into the customer's own systems, for sale to end-users of the systems. For example, large, complex systems, such as complex commercial computing systems may be composed of many components that an OEM receives from several vendors. Such components can include central processing units, data storage devices, output devices, routers, switches, and other computing or electronic devices. The OEM customer cannot readily obtain pricing and ordering information about the vendor's products to incorporate into the customer's own applications and databases without manually reentering or transferring the information. For example, if the delivery dates of the vendor's products change (e.g., are delayed), then the OEM must reenter or manually change the delivery dates to incorporate those changes into its own ordering and manufacturing assembly software so as to provide accurate delivery dates to its own end-user customers for systems provided by the OEM that incorporate the vendor's products.

In contrast, the invention is directed to techniques for processing order messages in predefined formats that substantially overcome such limitations of conventional systems. The predefined formats, such as document formats based on an extended markup language or XML, can be readily used by a customer that is exchanging order messages with a vendor's order server. These predefined formats enable different clients to provide order messages in a format that can be readily received and processed by an order message processing application (e.g., order message manager) configured according to embodiments of the invention at the order server. The vendor's order processing application can sort the messages into predefined types so that different message processing modules can efficiently process the messages, because each module is designed to process a specific type of message indicated by the predefined order message formats. Because the messages are based on predefined formats, the sorting process can proceed automatically without the intervention of a human operator.

The vendor's ordering processing application can then return messages in predefined formats to the customer in response to the input order messages. Because embodiments of the invention produce output order messages in the predefined format, the customer's ordering application can then readily incorporate returned messages (i.e., output order messages from the vendor) into the customer's own ordering application and order databases. If receiving returned messages from different order processing applications from the vendor or different applications from several different vendors that follow the same predefined formats, then the customer's own ordering application can readily incorporate the returned order messages received from different sources and integrate the returned data in the messages into a unified customer database, without requiring that the customer reenter the data received from the vendor or otherwise engage in a cumbersome manual transfer of the data from one format to another for entry into the customer's database(s).

In one embodiment, the invention is directed to a method, in an order server, for processing order messages. The method includes a step of receiving a first message of the order messages over a network, where the first message comprises a first document organized in a first predefined format. The method also includes steps of obtaining a first data set from the first message based on the first predefined format of the first document in response to receiving the first message, obtaining a second data set by processing the first data set of the first message in response to obtaining the first data set, and providing over the network the second data set in a second message comprising a second document organized in a second predefined format suitable for use by an ordering application. Thus the customer's ordering application receives a response to the customer's order request (e.g., check order status request) in a format that the ordering application can readily process and incorporate into the customer's order database without requiring any manual operation by the customer.

In another embodiment, the order server is a vendor order server and the ordering application is a customer ordering application. The method additionally includes the steps of receiving a first extended markup language document from the customer ordering application, obtaining the first data set from a first predefined element of the first extended markup language document, invoking an ordering function based on a message type defined in a second predefined element of the first extended markup language document to generate the second data set, and providing the second data set in a third predefined element in a second extended markup language document to the customer ordering application. As a result, the order messages can include XML (extended markup language) documents, which provides a readily processed language for the predefined XML elements provided in the documents.

In an additional embodiment, the method includes directing the first message to a first message processing module of a plurality of message processing modules. Thus the order server directs the order message to a particular module for processing.

In a further embodiment, the method includes parsing the first message to determine a message type that identifies an ordering function for the first message, and directing the first message to the first processing module based on the message type. As a result, the order message is processed by a particular module that is designed to process that type of order message, enabling more efficient processing than if all messages were processed by the same module.

The method includes, in another embodiment, interacting with an order database based on the first data set and based on a message type of the first message to generate the second data set. For example, the order server can receive a status inquiry regarding the status of a previously submitted order in an input order message from a customer. Then, the order server can obtain the current status from the order database to return to the customer in an output order message from the order server to the customer.

In another embodiment, the method includes performing an ordering function based on the first data set and based on a message type of the first message to generate the second data set. For example, the message processing module performs a specific ordering function, such as order status inquiry, new order submittal, order configuration, and so on.

In a further embodiment, the second predefined format is suitable for integration into a database maintained by the ordering application. Thus the output order message received by the customer from the order server can be in a format that the customer's ordering application can read and readily transfer to the customer's own database of order information.

In an additional embodiment, the first document and the second document are extended markup language documents. Thus, the documents provided in the order messages can be based on XML (extended markup language), which provides a readily processed language for the predefined XML elements in the documents.

In some embodiments, the techniques of the invention are implemented primarily by computer software. Such computer program logic embodiments, which are essentially software, when executed on one or more hardware processors in one or more hardware computing systems cause the processors to perform the techniques outlined above. In other words, these embodiments of the invention are generally manufactured as a computer program stored on a disk, memory, card, or other such media that can be loaded directly into a computer, or downloaded over a network into a computer, to make the device perform according to the operations of the invention. In one embodiment, the techniques of the invention are implemented in hardware circuitry, such as an integrated circuit (IC) or application specific integrated circuit (ASIC).

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 7A through 7E illustrate an example of an output document in a predefined format configured in accordance with embodiments of the invention.

DETAILED DESCRIPTION

The invention is directed to techniques for processing order messages in predefined formats. The predefined formats, such as document formats based on an extended markup language or XML, can be readily used by a customer that is exchanging order messages with a vendor's order server. These predefined formats enable different clients to provide order messages in a format that can be readily received and processed at the order server by an order message processing application (e.g., order message manager) configured according to embodiments of the invention. The vendor's order processing application can sort the messages into predefined types so that different message processing modules can efficiently process the messages, because each module is designed to process a specific type of message indicated by the predefined order message formats. Because the messages are based on predefined formats, the sorting process can proceed automatically without the intervention of a human operator.

The vendor's ordering processing application can then return messages in predefined formats to the customer in response to the input order messages. Because embodiments of the invention produce output order messages in the predefined format, the customer's ordering application can then readily incorporate returned messages (i.e., output order messages from the vendor) into the customer's own ordering application and order databases. If receiving returned messages from different order processing applications from the vendor or different applications from several different vendors that follow the same predefined formats, then the customer's own ordering application can readily incorporate the returned order messages received from different sources and integrate the returned data in the messages into a unified customer database, without requiring that the customer reenter the data received from the vendor or otherwise engage in a cumbersome manual transfer of the data from one format to another for entry into the customer's database(s).

Figure 1:
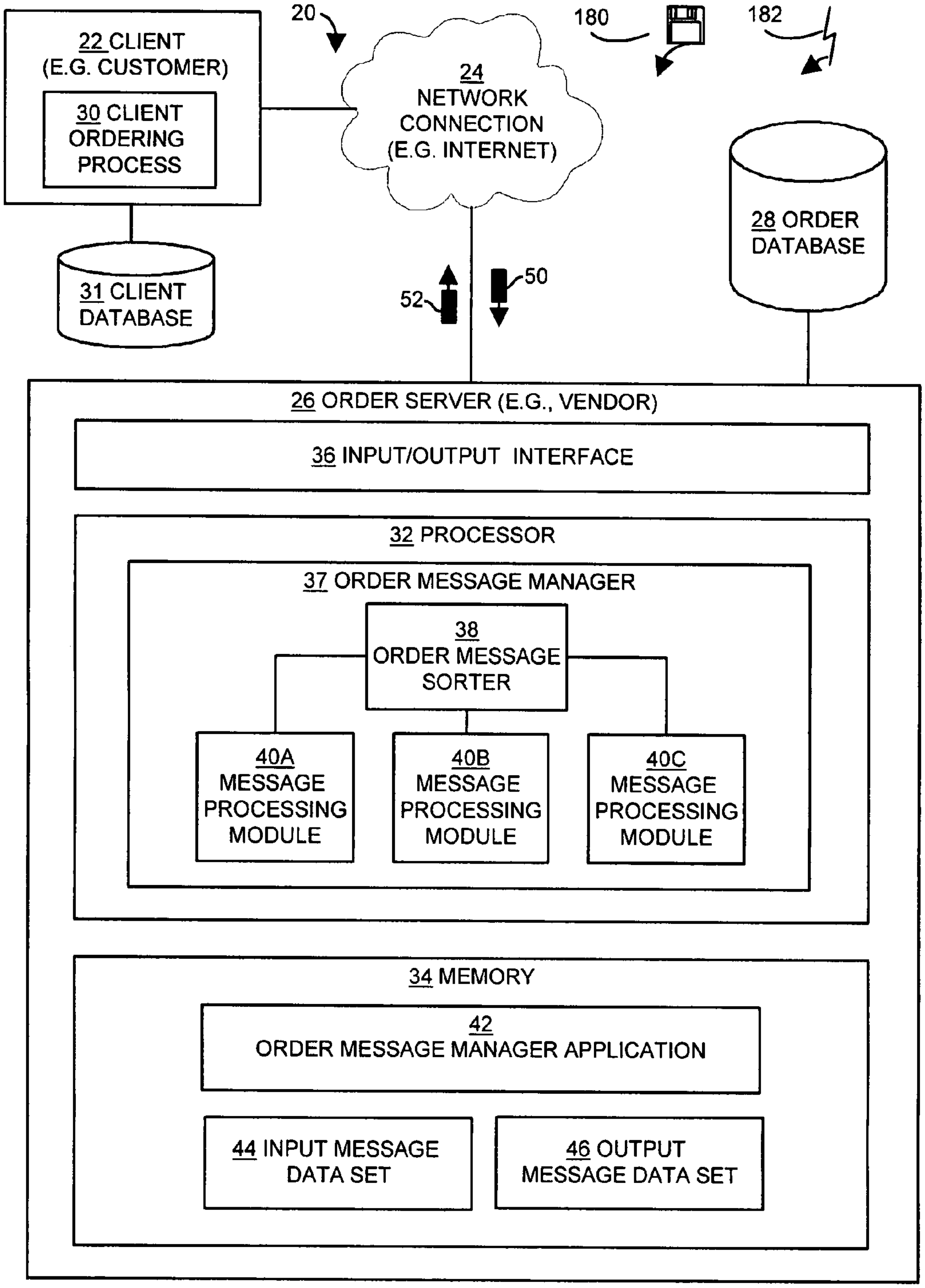
FIG. 1 is a block diagram illustrating a sample computing system environment including a client computer, an order server, and an order database configured according to embodiments of the invention.

FIG. 1 is a block diagram illustrating a computing system environment 20 including a client 22, client database 31, network connection 24, an order server 26, and an order database 28 configured according to embodiments of the invention.

The client (e.g., customer) 22 is any suitable computing system that can be used to exchange order messages 50, 52 with an order server 26. In alternate embodiments, the client can be a desktop computer, a laptop computer, palmtop computers, or other type of computer or electronic device capable of transmitting and receiving order messages 50, 52. The input order message 50 is an order message transmitted from the client 22 through the network connection 24 to the order server 26. The output order message 52 is an order message received by the client 22 through the network connection 24 from the order server 26. The order messages 50, 52 are messages preferably based on a tagged document format, in which the text of the message is marked with tags indicating format, category, or other information about the text. In one embodiment, the order messages 50, 52 are based on an extended markup language (XML) format. A memory of the client is encoded with logic instructions for a client ordering process 30, which is a process that performs ordering functions on a processor (e.g., microprocessor) of the client 22, such as generating input order messages 50, storing the customer's order information in a client database 31, and receiving output order messages 52 returned from the order server 26. The client 22 is in communication with a client database 31 which is any type of suitable data storage device (e.g., disk) capable of storing ordering data and other data for use by the client 22.

The network connection 24 is a communication connection, modem connection, or network providing communications between the client 22 and the order server 26. In one embodiment, the network connection 24 is a packet-based network, such as the Internet based on the TCP/IP (Transmission Control Protocol/Internet Protocol). In this embodiment, the order messages 50, 52 are based on HTTP (Hypertext Transfer Protocol) requests and responses that include the ordering information as tagged documents within the request. In such an embodiment, the customer communicates with the order server 26 through a network browser, such as Internet Explorer (manufactured by Microsoft Corporation of Redmond, Wash., USA) or Netscape Navigator (manufactured by Netscape Corporation of Mountain View, Calif., USA).

The order server 26 is a server computer, including a processor 32, a memory 34, and an input/output interface 36, which are connected by the internal circuitry (e.g., bus or other interconnection mechanism) of the order server 26. The processor 32 is any type of processing unit (e.g., microprocessor) which preferably operates electronically to process logic instructions. The memory 34 is any type of memory suitable for use with the processor 32, and preferably includes volatile memory (e.g., RAM or random access memory) and nonvolatile memory (e.g., EPROM or erasable programmable read only memory, or disk). The memory 34 stores data such as an input message data set 44, which is included as part of the input order message 50, and an output message data set 46, which is the basis for the output order message 52, as will be discussed in more detail later. The memory 34 is encoded with logic instructions (e.g., software code, such as object code) for an order message manager application 42 which perform on the processor 32 to form an order message manager 37. The instructions for the order message manager application 42 perform on the processor 32 such that the order message manager 37 includes an order message sorter 38, that sorts incoming order messages 50 to be processed by message processing modules 40 (e.g., 40A, 40B, and 40C). The input/output interface 36 provides communications services and connections for the order server 26 to the network connection 24 and to the order database 28. The order database 28 is any type of suitable data storage device (e.g., disk) capable of storing ordering data and other data for use by the order server 26.

In one embodiment, a computer program product 180 including a computer readable medium (e.g., one or more CDROM's, diskettes, tapes, etc.) provides software instructions (e.g., logic instruction of the order message manager application 40) for the order message manager 37. The computer program product 180 can be installed by any suitable software installation procedure, as is well known in the art. In another embodiment, the software instructions can also be downloaded over a wireless connection. A computer program propagated signal product 182 embodied on a propagated signal on a propagation medium (e.g., a radio wave, an infrared wave, a laser wave, sound wave, or an electrical wave propagated over the Internet or other network) provides software instructions for the order message manager 37. In alternate embodiments, the propagated signal is an analog carrier wave or a digital signal carried on the propagated medium. For example, the propagated signal can be a digitized signal propagated over the Internet or other network. In one embodiment, the propagated signal is a signal that is transmitted over the propagation medium over a period of time, such as the instructions for a software application sent in packets over a network over a period of seconds, minutes, or longer. In another embodiment, the computer readable medium of the computer program product 180 is a propagation medium that the computer can receive and read, such as by receiving the propagation medium and identifying a propagated signal embodied in the propagation medium, as described above for the computer program propagated signal product 182.

In a general summary of the techniques of embodiments of the invention, a customer uses the client computer 22 to provide an input order message 50 through the network connection 24 to the order server 26. The order message manager 37 receives the input order message 50 through the input/output interface 36. The order message sorter 38 of the order message manager 37 determines what type of message the input order message 50 is. The order message sorter 38 then passes the input order message 50 to a message processing module 40 that is capable of handling that type of message. The message processing module 40 processes the input order message 50, obtains data from the order database 28 if need be, and produces an output order message 52 for transmission back to the client 22. FIGS. 2 through 5 illustrate this order processing process in more detail, and FIGS. 6A through 7E illustrate sample order documents 300, 330 that can be incorporated into examples of order messages 50, 52.

Figure 2:
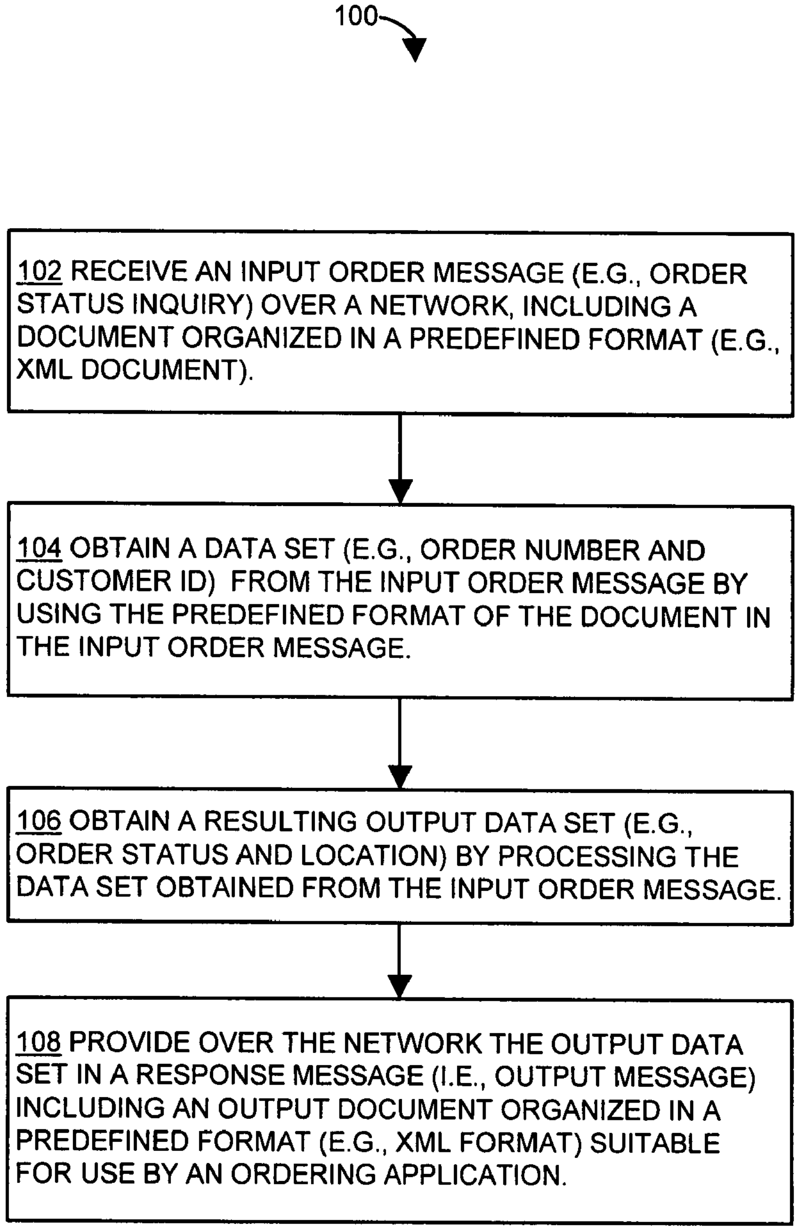
FIG. 2 is a flow chart of a procedure for processing an input order message and providing a result performed by an order server configured in accordance with embodiments of the invention.

FIG. 2 is a flow chart of a procedure 100 for processing an input order message 50 and providing a result performed by an order server 26 configured in accordance with embodiments of the invention.

In step 102, the order message manager 37 of the order server 26 receives though the input/output interface 36 an input order message 50 sent from the client 22 over the network connection 24 to the order server 26. The input order message 50 includes a document organized in a predefined format (e.g., XML document), as described in the examples shown in FIGS. 6A and 6B. The order message manager 37 passes the input order message 50 to the order message sorter 38, which evaluates the input order message 50 (e.g., examines a header or first lines of the message) to determine a type or category for the input order message 50. The order message sorter 38 then determines which message processing module 40 is suited to process that type of message and passes the input order message 50 to that message processing module 40. For example, the input order message 50 includes an order status inquiry that requests the status of an order that the customer previously sent to the order server 26 through a previous input order message 50 that submitted the order. In one particular example, the input order message 50 is an HTTP request sent from the client 22 over the Internet (i.e., network connection 24) to the order server 26 that includes the order status inquiry as part of the HTTP request.

In step 104, the message processing module 40 obtains an input message data set 44 from the input order message 50 by using the predefined format of the document in the input order message 50. For example, a status message processing module 40 can examine the document in the input order message 50 (e.g., status inquiry) to determine which lines, tagged elements, or parts of the document indicate the order number for which the customer wishes to obtain the status, and the customer ID or identifier that identifies the customer who submitted the input order message 50.

In step 106, the message processing module 40 obtains a resulting or output message data set 46 by processing the input data set 44 obtained from the input order message 50. For example, the message processing module 40 uses the customer ID and order number to obtain information about the status of the order and location of the order (e.g., manufacturing, shipping, etc.) from the order database 28. The message processing module 40 then stores this status information as the output message data set 46 in the memory 34 of the order server 26 until ready to send an output order message 52 that includes the output message data set 46 to the client 22. Alternatively, the message processing module 40 can store the output message data set 46 on the order database 28 until ready to send the output order message 52 to the client 22.

In step 108, the order message manger 37 provides over the network connection 24 to the client 22 the resulting output message data set 46 in a response or output order message 52, including a document organized in a predefined format suitable for use by the client ordering process 30, as described in more detail for the examples shown in FIGS. 7A through 7E. For example, the message processing module 40 of the order message manager 37 provides status information contained in the output message data set 46 in an XML document in an output order message 52, to be sent through the input/output interface 36 through the network connection 24 to the client 22. Thus the output order message 52 includes an XML document that provides the status information in predefined XML format (as defined previously in an XML document type definition document) so that the client's ordering process 30 can readily interpret the status information, extract the status information from the predefined XML document, and then (i.e., without manual reentry of the status information) automatically update the status of the order in the client database 31.

In one embodiment, the client 22 and the order message manager 37 exchange messages 50, 52 in a secure manner. For example, the client 22 and the order message manager 37 exchange messages 50,52 using a digital certificate approach to verify users and/or messages. In addition, the client 22 and the order message manager 37 can use a secure sockets layer (SSL) approach to provide security for the messages 50,52.

Figure 3:
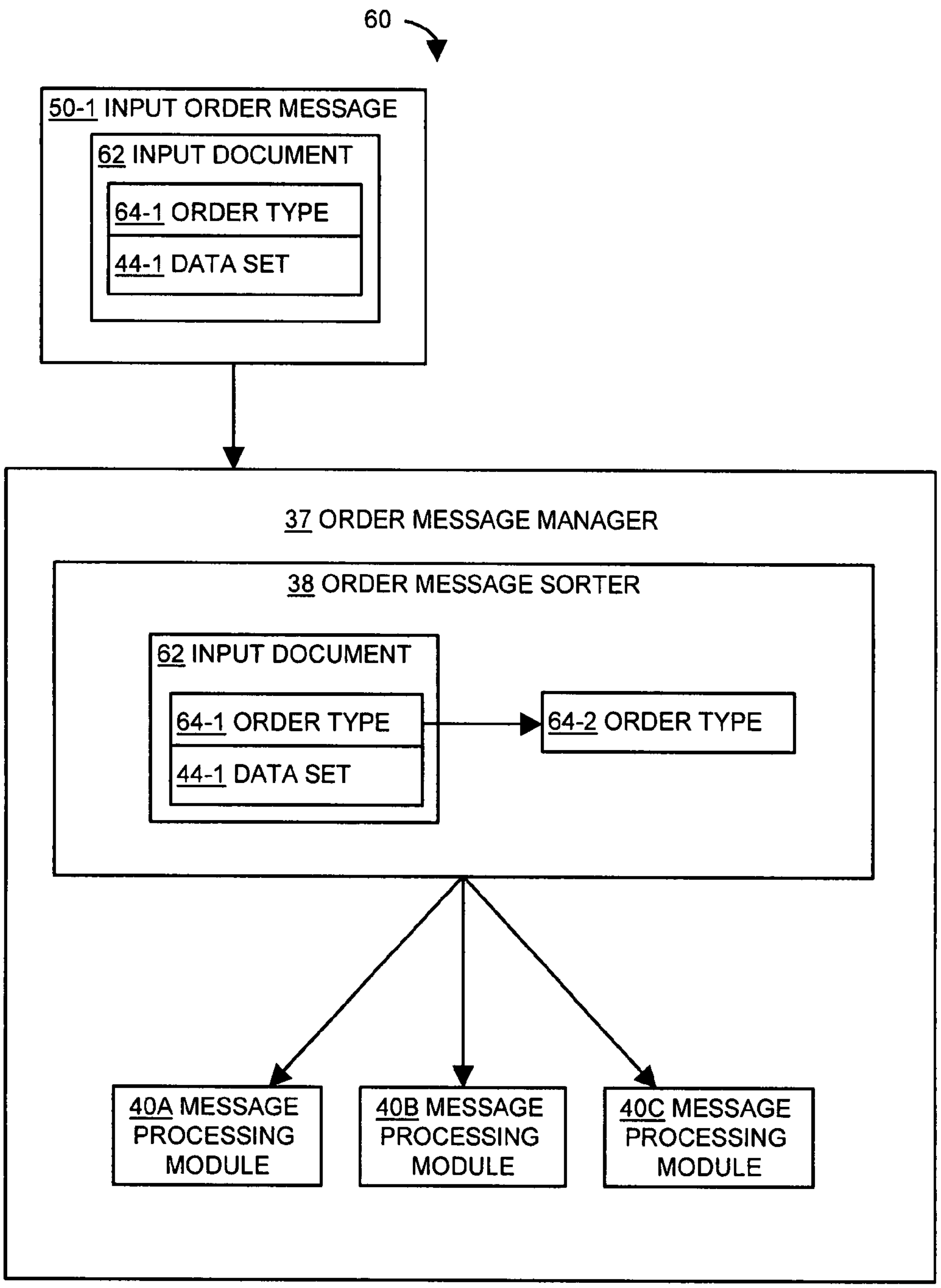
FIG. 3 is a block diagram of an order message sorter in an order message manager of an order server configured in accordance with embodiments of the invention.

FIG. 3 is a block diagram of an order message sorter 38 of an order message manager 37 performing on an order server 26 in an input order processing environment 60 configured in accordance with embodiments of the invention. FIG. 3 also illustrates an input order message 50-1, which is one example of the input order message 50 of FIG. 1. The input order message 50-1 includes an input document 62, which is in a predefined format that includes, in one embodiment as shown in FIG. 3, an embedded order type 64-1 and embedded input data set 44-1. FIG. 3 also shows an extracted order type 64-2, which indicates the order type information 64 that the order message sorter 38 has extracted from the input document 62. That is, the extracted order type 64-2 includes the same order type information 64 as the embedded order type information 64-1 of the input document 62. In one embodiment, the extracted order type 64-2 is in a different format from the embedded order type information 64-1. See the discussion of the flowchart of FIG. 5 for more information on the process of extracting the order type information 64-2 from input documents 62, sorting input documents 62, and directing input documents 62 to message processing modules 40.

Figure 4:
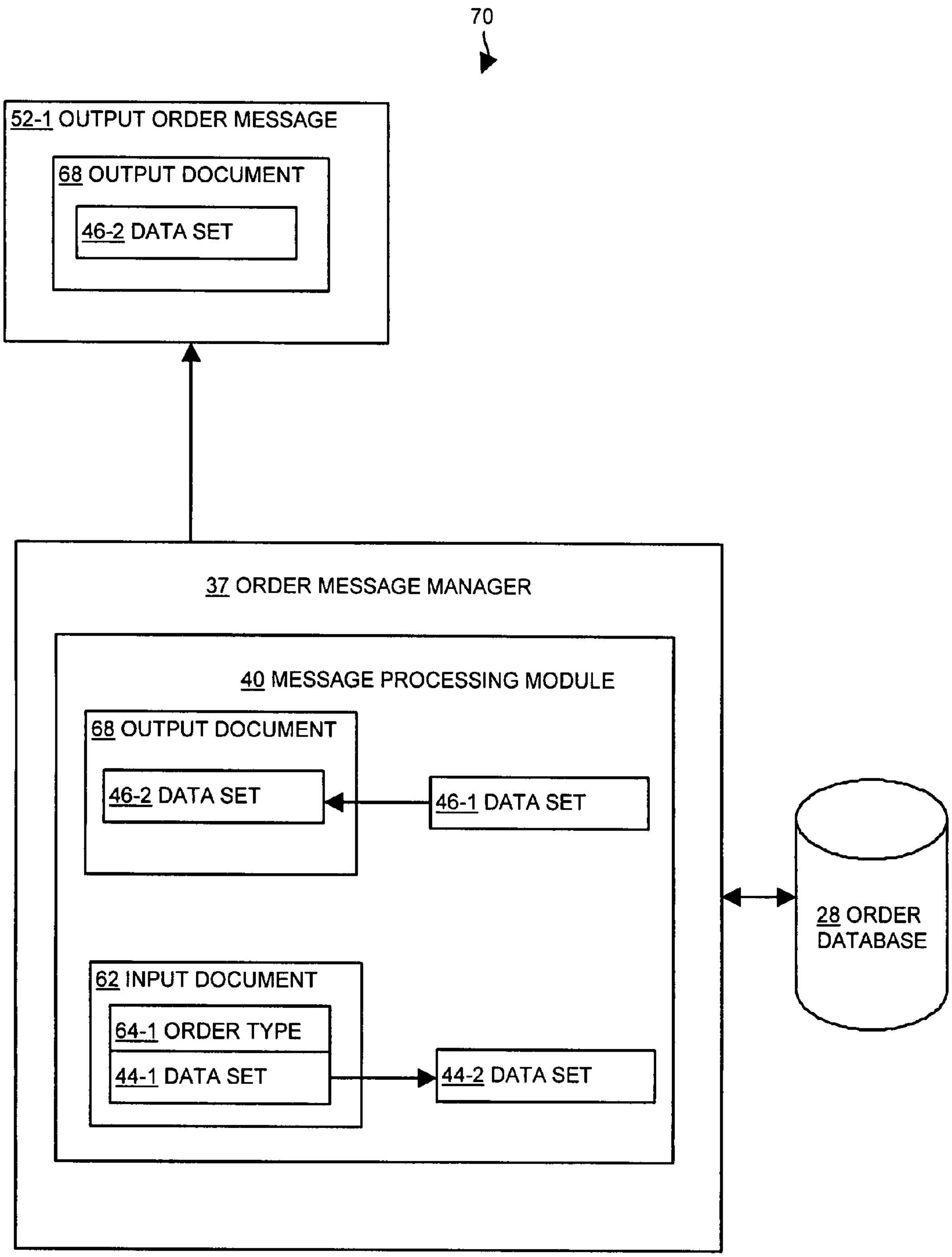
FIG. 4 is a block diagram of a message processing module in an order message manager of an order server configured in accordance with embodiments of the invention.

FIG. 4 is a block diagram of a message processing module 40 of an order message manager 37 performing on an order server 26 in an output order processing environment 70 configured in accordance with embodiments of the invention. FIG. 4 illustrates an extracted input data set 44-2 that the message processing module 40 extracts from an input document 62 containing an embedded input data set 44-1. FIG. 4 also illustrates an output data set 46-1 that the message processing module 40 includes as an embedded output data set 46-2 in an output document 68, which is then included in an output order message 52. See the discussion of the flowchart of FIG. 5 for more information on the process of extracting the input data set 44-1 from the input document 62, embedding the output data set 46-1 in the output document 68, and producing the output order message 52.

Figure 5:
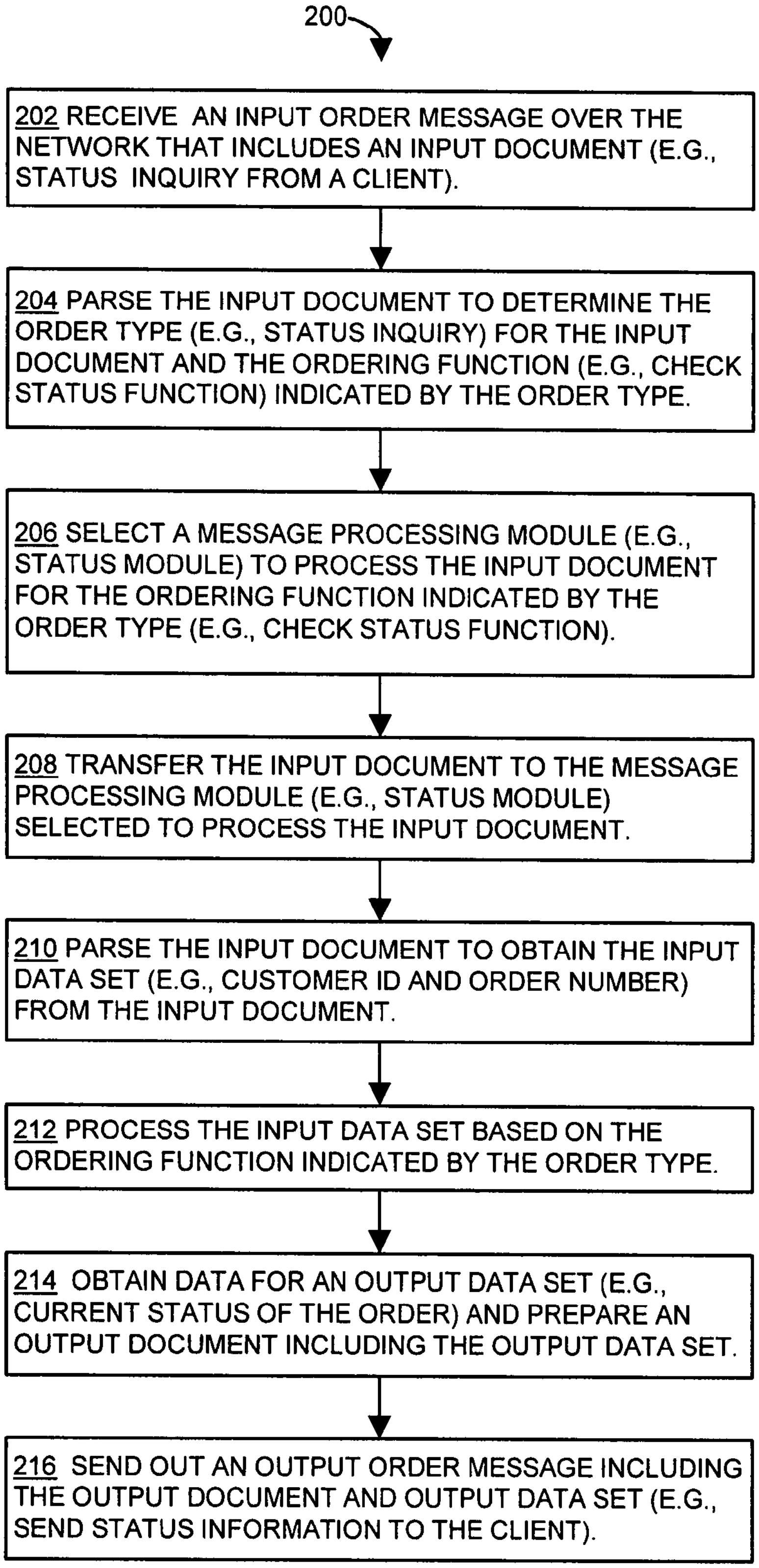
FIG. 5 is a flow chart of a procedure for processing an input document of an input order message performed by an order server in accordance with embodiments of the invention.

FIG. 5 is a flow chart of a procedure 200 for processing an input document 62 of an input order message 50 performed by an order server 26 in accordance with embodiments of the invention.

In step 202, the order message sorter 38 of the order message manager 37 receives an input order message 50-1 over the network connection 24 that includes an input document 62. For example, the embedded order type 64-1 indicates that the input order message 50-1 is an order status inquiry that requests the current status of an order that a customer previously submitted in a previous input order message 50. In such an example, the embedded input data set 44-1 includes information related to the status inquiry, such as the customer ID of the order and the order number for the previous order.

In step 204, the order message sorter 38 parses the input document 62 to determine the order type for the input document 62 and the ordering function indicated by the order type. For example, the order message sorter 38 reads the header, order type element, or first lines of an XML input document 62 based on a predefined format that provides the embedded order type information 64-1 to obtain an extracted version of the order type information 64-2. In this example, the order message sorter 38 determines that the extracted order type information 64-2 indicates that the ordering function requested is a status inquiry (e.g., check status function) for a previously submitted order.

In step 206, the order message sorter 38 selects a message processing module 40 to process the input document 62 for the ordering function indicated by the order type information 64-1. For example, the order message sorter 38 selects a message processing module 40 that is suited to perform a check status function as indicated by the extracted order type information 64-2.

In step 208, the order message sorter 38 transfers the input document 62 to the message processing module selected to process the input document 62. For example, the order message sorter 38 transfers the input document 62 to a status message processing module 40 that can perform the check status function requested by the extracted order type 64-2.

In step 210, the message processing module 40 parses the input document 62 to obtain an extracted input data set 44-2 from the embedded data set 44-1 in the input document 62. For example, the message processing module 40 that is performing a check status function parses an XML input document 62 having a predefined XML element that identifies the order information, such as customer ID and order number, in the XML document 62.

In step 212, the message processing module 40 processes the extracted input data set 44-2 based on the ordering function indicated by the extracted order type 64-2. For example, the status message processing module 40 determines the identity of a previous order submitted to the order database 28, as indicated by the customer ID and order number provided by the extracted input data set 44-2.

In step 214, the message process module 40 obtains data for an output data set 46-1 and prepares an output document 68 including an embedded output data set 46-2. For example, the status message processing module 40 obtains data for the output data set 46-1 by accessing the order database 28 to obtain the current status for the previous order indicated by the customer ID and order number in the extracted input data set 44-2. Then, in this example, the status message processing module 40 prepares an output document 68 that includes an embedded output data set 46-2 based on the output data set 46-1 that includes the status information obtained from the order database 28.

In step 216, the message processing module 40 sends out an output order message 52-1 including the output document 68 and embedded output data set 46-2. The output order message 52-1 is one example of the output order message 52 of FIG. 1. For example, the message processing module 40 sends the status information in the embedded output data set 46-2 in the output document 68 in an output order message 52-1. The message processing module 40 sends the output order message 52-1 through the input/output interface 36 of the order server 26 over the network connection 24 to the client 22.

Figure 6A:
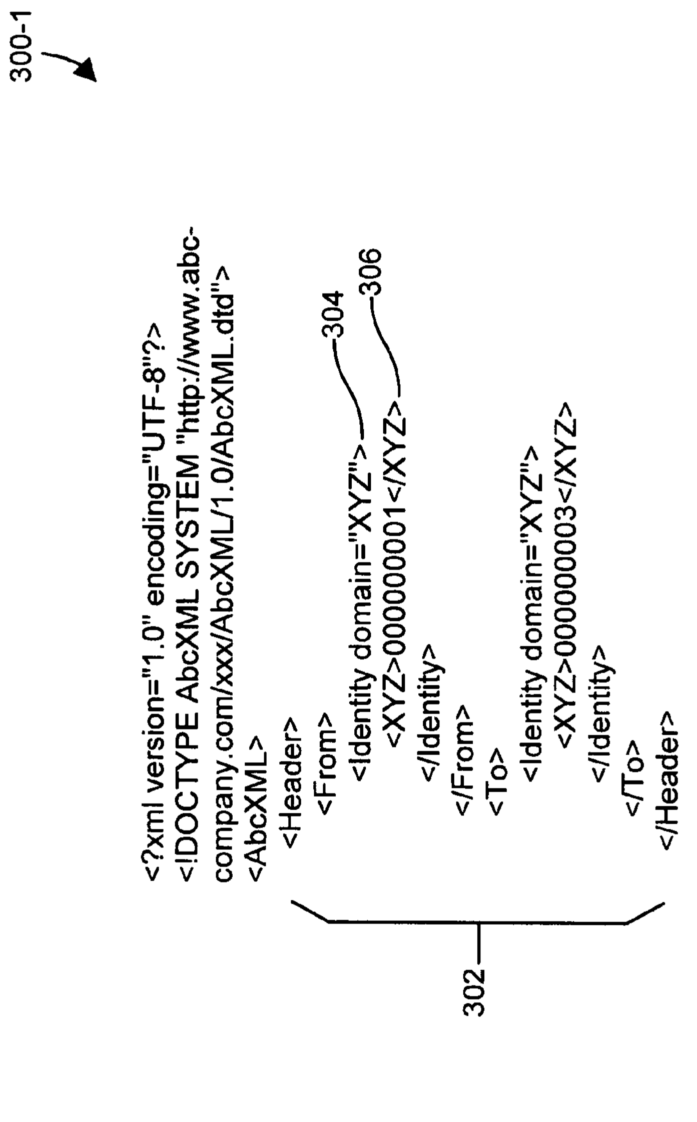
FIGS. 6A and 6B illustrate an example of an input document in a predefined format configured in accordance with embodiments of the invention.
Figure 6B:
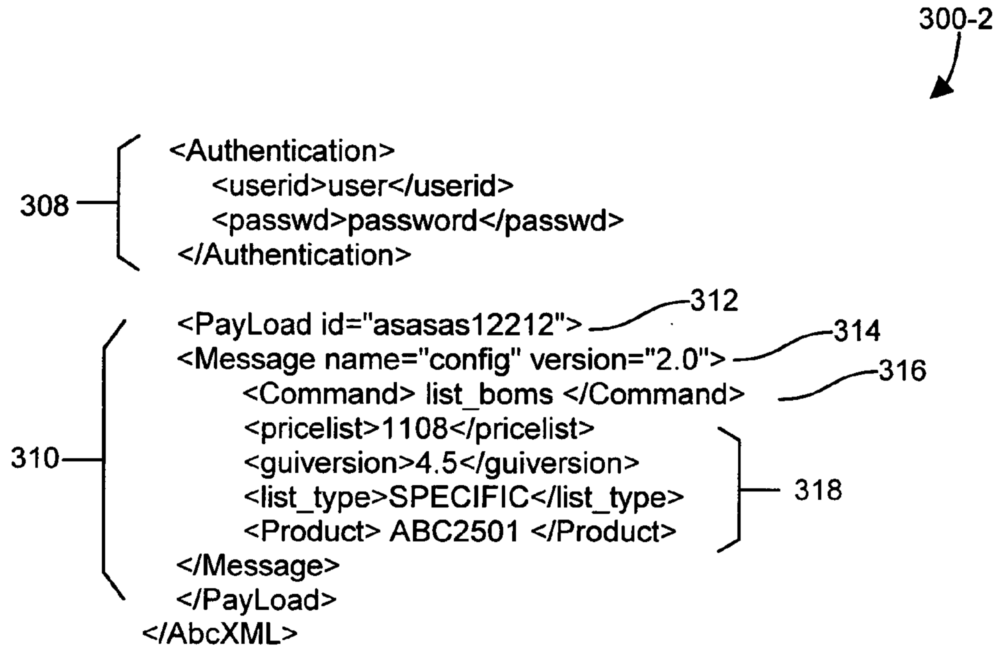

FIGS. 6A and 6B illustrate an example of an input document 300 (e.g., 300-1 and 300-2) in a predefined format configured in accordance with embodiments of the invention. FIG. 6A shows the first part on the sample input document 300-1 and FIG. 6B shows the second part of the sample input document 300-2. The input document 300-1 and 300-2 is one example of the input document 62 shown in FIG. 3.

In reference to FIG. 6A, a header section 302 of the input document 300 provides information on the source of the input document 300, indicated by the <FROM> tag and the destination of the input document 300, indicated by the <TO> tag. The source typically is one company (e.g., an OEM) that is sending an input order message 50 containing the input document 300 to another company (e.g., a vendor supplying one or more components to the OEM). Each company is identified by a unique number or identifier, as indicated, for example, by the identifier 306 for the company originating the input document 300. The identifier 306 is based on a domain of numbers or identifiers that identify each company, as indicated, for example, by the identity domain 304, which indicates a numbering domain that is referred to, as a hypothetical example in FIG. 6A, as the XYZ domain. In another example, the identity domain 304 is based on the Dun and Bradstreet D-U-N-S® (Data Universal Numbering System) system that provides unique identifiers for business entities, such as corporations.

An authentication section 308 includes information from the sending company that the receiving company uses to authenticate the input document 300 as coming from a legitimate customer of the vendor. For example, the authentication section 308 includes a user identification (e.g., identification number or code) and a password for that user.

A data section 310 provides the payload or data section for the input document 300. The data section 310 provides the data for the input message data set 44, which the message processing module 40 extracts from the input document 62, as described for FIG. 4. The payload ID 312 provides a unique number that can be used by the sender's (i.e., client's) ordering process 30 and the receiver's (i.e., vendor's) order message manager 37 to identify the input document 300. The message name entry 314 indicates the category for the command shown in the command entry 316 included in the data section 310. As shown in FIG. 6B, the message name entry 314 indicates that a task category (e.g., "config") that is for tasks related to configuration of the component that the sender is ordering. The command entry 316 indicates a command for a specific task, shown for example in FIG. 6B as "list_boms", which indicates to return to the sender (e.g., customer) of the input document 300 a list of the bill of materials (BOMS) for a product sold by the receiver (e.g., vendor) of the input document 300. The parameters section 318 lists parameters associated with the command 316, which indicates, for example, the price list to be used for this product (e.g., a price list identified by "1108"), the product the customer is considering ordering (e.g., as identified by "ABC2501"), and other information.

In one embodiment, the task categories that can be shown in a task category entry 316 include configuration, pricing, addressing, order status, order submittal, kit references, zero pricing, and administration. Each task category includes commands that a customer can use to perform ordering tasks in that category. These commands correspond to an API (application programming interface) implemented in the message processing modules 40 of the order message manager 37 of the order server 26. See Appendix A for a listing of the commands in the API.

Each task category is summarized in the following: The configuration category includes tasks related to configuring a product that the customer is considering ordering. The pricing category includes tasks related to pricing a product, such as discounts for a particular market segment of customers. The addressing category includes tasks related to customer addresses, such as listing the address of a current customer or providing an address for a new customer. The order status category includes tasks related to the status of an order, such as requesting the current status of an existing order. The order submittal category includes tasks related to submitting an order from a customer, such as ship-to information, bill-to information, contact information, shipping method, and other information. The kit references category includes tasks related to specific configurations, such as configuration kits for products to be shipped to specific countries. The zero pricing category includes tasks related to components, such as power cables, that are not priced separately, that is, the price for a component (e.g., router) covers the price for the zero price components (e.g., power cable for the router). The administration category includes tasks related to administering and operating the order message manager 37, such as diagnostic tasks. Appendix A provides examples for commands for these task categories.

Figure 7B:
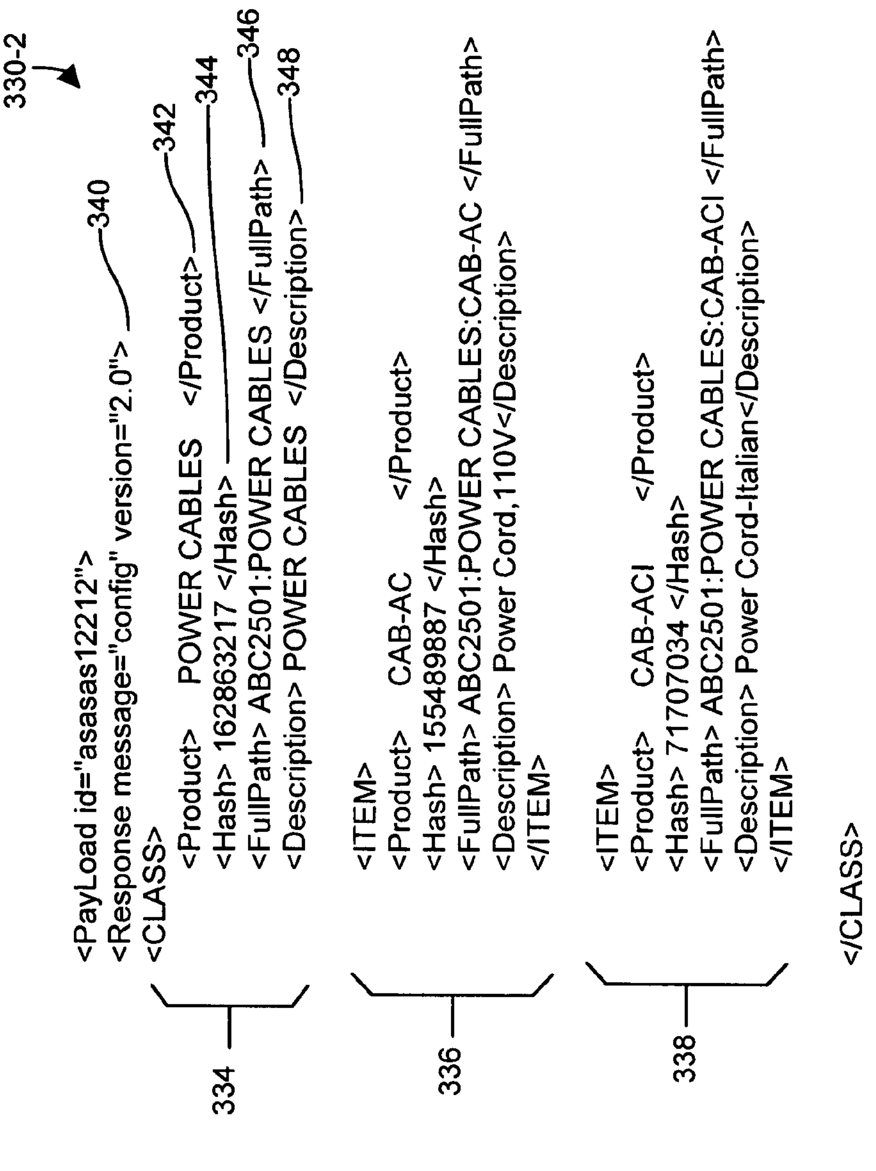

FIGS. 7A through 7E illustrate an example of an output document 330 (e.g., 330-1, 330-2, 330-3, 330-4, and 330-5) in a predefined format configured in accordance with embodiments of the invention, provided by a vendor in response to the input order document 300 shown in FIGS. 6A and 6B. FIG. 7A shows the first part of the sample output document 330-1; FIG. 7B shows the second part of the sample output document 330-2; FIG. 7C shows the third part of the sample output document 330-3; FIG. 7D shows the fourth part of the sample output document 330-4; and FIG. 7E shows the fifth part of the sample output document 330-5. The output document 330 is one example of the output document 68 shown in FIG. 4.

In reference to FIG. 7A, the header section 332 provides identifiers for the sender and the receiver of the output document 68, in a manner similar to that described for the header section 302 of the input document 300, as described previously.

In reference to FIG. 7B, a response message entry 340 indicates the category for the response. As shown in the response message entry 340, the category is "config", which corresponds to the category indicated in the message name entry 314 of the input document 300. A data section provides the payload or data for the output document 330. The data section is indicated by entries 334 through 338, and entries 360 through 376, as shown in FIGS. 7B through 7E. This data section provides the data for the output message data set 46, which the message processing module 40 incorporates in the output document 330, as described for FIG. 4. For example, the input document 300 provides a command to list the BOMS for a product, and thus the output document 330 provides sample lists of subcomponents for this product, such as power cables 334, 336 and 338, software 360 through 372, documents 374, and rack mount kits 376. The customer receives the output document 330 and then typically selects the desired subcomponents from those listed in the output document 330 (e.g., a specific type of power cable needed) when configuring the customer's order.

In reference to FIG. 7B, the class section 334 indicates a class of components for the system requested in the input document 300, for example, a class of power cables as shown in a product entry 342. In one embodiment, the product entry 342 can indicate a product, component of a product, or subcomponent of a component. The hash entry 344 indicates a hash number that can be used to locate information on the class of components in the vendor's order database 28. The full path entry 346 indicates the full path to the class information in the vendor's order database 28. In one embodiment, the full path entry 346 follows a hierarchical tree format (e.g., parent:child:grandchild). The description entry 348 provides a text description of the component indicated in the product entry 342.

The item entries 336 and 338 indicates specific items within the class indicated by the class entry 334 (e.g., power cables). For example, the item entries 336 and 338 indicate specific types of power cables (e.g., USA and Italian power cords) within the class of power cables. The item entries 336 and 338 shown in FIG. 7B are shown as one example, and more entries (e.g., power cords for additional countries) can be included under the class entry 334.

In reference to FIGS. 7C and 7D, the class entry 360 indicates a class of software for the product indicated in the input document 300. The minor class entries 362 and 368 indicate minor classes or subclasses of software components under the software class indicted by class entry 360. Two software items 364 and 366 indicate specific software versions under the minor software class indicated in the minor class entry 362. Two software items 370 and 372 indicate specific software versions under the minor software class indicated in the minor class entry 368.

In reference to FIG. 7E, the class entry 374 indicates a class of documentation related to the product indicated in the input document 300. The class entry 376 indicates a class of rack mount components for the product indicated in the input document 300 (e.g., components that enable the mounting of the product in a rack setup).

The techniques of the invention do not require that the output document 330 include classes, minor classes, and items as shown in FIGS. 7A through 7E, which are shown as one example only of a predefined format.

Thus, as shown by the output document 330, the predefined formats shown in FIGS. 7A through 7E allow the customer to readily transfer the data in the output document 330 to a customer's application, such as an ordering process 30 or other software application performing on the client. For example, the ordering process 30 can read the output document 330 received from the vendor and efficiently interpret the data in the output document 330 by referring to the tags, such as <PRODUCT>, <CLASS>, <MINORCLASS>, <ITEM>, and other tags, to classify and interpret the data. Then the ordering process 30 can automatically convert the data into a local format used in the customer's client database 31 without requiring ongoing manual or human intervention (after an administrator or other operator sets up an automatic mapping between the predefined format of the output document 330 to the format used in the client database 31).

In summary of the approach of the invention, a client 22 (e.g., customer) provides an input order message 50 that includes an input document 62 providing a command and data in a predefined format. The client 22 sends the input order message 50 to an order message manager 37 performing on an order server 26. The order message manager 37 interprets the input document 62 based on the predefined format, and an order message sorter 38 determines an order type 64 for the input document 62. Based on the order type 64, the order message sorter 38 directs the input document 62 to a message processing module 40 which implements one or more commands in an order processing API implemented on the order server 26. The message processing module 40 extracts the input data set 44 from the input document 62 and processes the input data set 44 based on the data and the command indicated in the input data set 44. The message processing module 40 generates an output data set 46 based on the input data set 44, such as by obtaining data from the order database 28 to use in generating the output data set 46. The message processing module 40 then incorporates the output data set 46 in an output document 68 to be sent in an output order message 52 to the customer, providing a response to the input order message 50 sent from the client 22.

While this invention has been particularly shown and described with references to preferred embodiments thereof, it will be understood by those skilled in the art that various changes in form and details may be made therein without departing from the spirit and scope of the invention as defined by the claims that follow Appendix A.

For example, the input document 62 and output document 68 can be based on other types of documents than an XML document, such as HTML (Hypertext Markup Language) documents, SGML (Standard Generalized Markup Language) documents, or other types of tagged documents.

In other examples, the network connection 24 is a local area network (LAN), such as an Ethernet, a wide area network (WAN), an enterprise wide network, a direct line connection, or other suitable network or communications connection.

In another example, the order server 26 is a PC server computer, UNIX server or workstation, minicomputer, or other type of suitable server computer.

In a further example, each message processing module 40 can handle a variable number of commands. For example, one message processing module 40 can process all of the commands in one task category. In addition, each message processing module 40 can be implemented on a separate server. Generally, the order message manager 37, order message sorter 38, and message processing modules 40 are not required to perform on the same computer (e.g., order server 26). That is, the functions of the order server 26 can be implemented in a distributed manner, such as by several computers connected in a local area network or by the Internet. The functions of a single message processing module 40 can also be implemented in a distributed computing or distributed object manner. Furthermore, the data from the input message data set 44 can be divided into subunits of data that can be processed by the different message processing modules 40, for example if the input message data set 44 includes a large number of different types of data or includes multiple commands.

APPENDIX A

The following appendix entitled "Listing of Order-Related Task Categories and Commands," provides an example of order-related task categories and commands suitable for use in order messages illustrating one approach of the invention and is meant to be considered as part of the detailed disclosure of embodiments of the invention. See the discussion for FIGS. 6A and 6B for a description of the task categories. The commands described in Appendix A, however, are to be considered as an example only, and it is to be understood that this example is not meant to be limiting of the invention.

Listing of Order-Related Task Categories and Commands

```
***********************************
pkl_api_msg.lst messages

pkl_generic_select.2
pkl_get_gtm_discount.2
pkl_list_carrier.2
pkl_list_market_segment.2
pkl_list_service_items.2

pklst/2.0
generic_select
username=user1
password=xxxxxxx1
sql_stmt=select distinct allow_discount from api_cco_plist_mapping
           where prlist_id='1108'

.
pklst/2.0
get_gtm_discount
username=user1
password=xxxxxxx1
customer_number=100070
po_type=
end_user_name=
end_user_country=
end_user_market_segment=
item_id=ABC1605-R

.
pklst/2.0
list_carrier
username=user1
password=xxxxxxxx

.
pklst/2.0
list_market_segment
username=user1
password=xxxxxxxx

.
pklst/2.0
list_service_items
username=user1
password=xxxxxxxx
price_list=1108
config_item=ABC2501

.
```

```
*************************************
adr_api_msg.lst messages

adr_list_addresses.2.BILL
adr_list_addresses.2.SHIP
adr_list_customer.2
adr_list_pricelists.2
adr_list_rel_customer.2
adr_new_define_address.2
adr_new_define_contact.2
adr_new_list_contacts.2
adr_temp_to_perm_addr.2
adr_temp_to_perm_contact.2

addressing/2.0
new_list_addresses
username=user1
password=xxxxxxxx
customer_number=100070
address_type=BILL

.
addressing/2.0
new_list_addresses
username=user1
password=xxxxxxxx
customer_number=100070
address_type=SHIP

.
addressing/2.0
list_customer
username=user1
password=xxxxxxxx

.
addressing/2.0
list_pricelists
username=user1
password=xxxxxxxx
customer_number=100070

.
addressing/2.0
list_rel_customer
username=user1
password=xxxxxxxx
customer_number=100070

.
Addressing/2.0
New_Define_address
username=user1
password=xxxxxxxx
Customer_Number=100070
```

```
customer=CUSTOMER1
address1=TESTING
address2=TESTING AGAIN
address3=TESTING LAST TIME
city=SAN JOSE
state=CA
zip=95134
Country=US

.
addressing/2.0
new_define_contact
username=user1
password=xxxxxxxx
contact_type=BILL
customer_number=100070
last_name=a
address_id=442008

.
addressing/2.0
new_list_contacts
username=user1
password=xxxxxxxx
customer_number=100070
contact_type=BILL
customer_id=100072

.
addressing/2.0
temp_to_perm_addr
username=user1
password=xxxxxxxx
customer_number=100072
address_id=442008

.
addressing/2.0
temp_to_perm_contact
username=user1
password=xxxxxxxx
contact_id=252867

.
```

```
*****************************
cfg_api_msg.lst messages
cfg_api_msg.lst
cfg_config_check.2
cfg_kit_check.2
cfg_list_boms.2
cfg_list_classes.2
cfg_list_configurables.2
cfg_list_families.2
cfg_list_items.2
cfg_list_visible.2
cfg_x_check.2

config/2.0
config_check
username=user1
password=xxxxxxxx
price_list=1108
zero_price=N
country=(None)

config/2.0
kit_check
username=user1
password=xxxxxxxx
country=canada


config/2.0
list_boms
username=user1
password=xxxxxxxx
GUIVERSION=4.5
price_list=1108
list_type=SPECIFIC


config/2.0
list_classes
username=user1
password=xxxxxxxx
price_list=1108
configurable=ABC1605-R
list_type=ALL

.
config/2.0
list_configurables
username=user1
password=xxxxxxxx
price_list=1108
family=9415
list_type=ALL

.
config/2.0
```

```
list_families
username=user1
password=xxxxxxxx
price_list=1108
family_type=ALL
list_type=ALL

.
config/2.0
list_items
username=user1
password=xxxxxxxx
price_list=1108
configurable=ABC1605-R
parent=1600-R SOFTWARE
list_type=ALL

.
config/2.0
list_visible
username=user1
password=xxxxxxxx
price_list=1108

config/2.0
x_check
username=user1
password=xxxxxxxx
price_list=1108
zero_price=N
country=(None)


************************
pricing_api_msg.lst messages

pr_def_price21
pr_lst_pricelists21
pr_lst_prices21
pr_set_mkt21
pricing/2.0
define_price
username=user1
password=xxxxxxxx
price_list=1108


pricing/2.0
list_pricelists
username=user1
password=xxxxxxxx
list_type=ALL

.
```

```
pricing/2.0
list_prices
username=user1
password=xxxxxxxx
price_list=1108
item_type=CO
list_type=QUERY

pricing/2.0
set_marketable
username=user1
password=xxxxxxxx
price_list=1108



*********************************
submit_api_msg.lst messages

sub_list21
sub_smt21
sub_view21

submit/2.0
list_orders
username=user1
password=xxxxxxxx
list_type=SPECIFIC

submit/2.0
submit_order
username=user1
password=xxxxxxxx
price_list=1108
test_only=N
purchase_order=sgs_ushirsat_ver21_t5_2011
terms=1% Net 30
order_type=STANDARD
po_type=Demo/Eval
ship_to_id=474453
ship_to_name=CUSTOMER2
ship_to_address1=TBD
ship_to_address2=
ship_to_address3=
ship_to_city=TBD
ship_to_county=
ship_to_state=
ship_to_zip=
ship_to_country=CZ
ship_to_contact_id=
ship_to_contact=
ship_to_phone=
ship_to_fax=
ship_to_email=
ship_to_contact_dept=
customer_number=102479
```

```
contact_name=
contact_phone=
contact_fax=ICS VERSION 4.05 / 30May2000
bill_to_id=440555
bill_to_name=ABC SYSTEMS INC US
bill_to_address1=GSTR 5A
bill_to_address2=
bill_to_address3=
bill_to_city=DIEBURG
bill_to_county=
bill_to_state=
bill_to_zip=64807
bill_to_country=DE
bill_to_contact_id=260575
bill_to_contact=JSMITH
bill_to_phone=
bill_to_fax=
bill_to_email=
end_user_customer_name=CUSTOMER2
end_user_address_postal_code=
end_user_address_city=TBD
end_user_address_state_id=
end_user_address_country_id=
end_user_address_id=474453
recipients_name=
shipper_account=
shipment_method=AAME5
freight_term=CIP Duty Unpaid1
merge=N
fob_point=Destination
requested_ship_date=20000609
shipment_priority=
email_order_to=yyyyyyyy@abc.com
fax_email_indicator=Email
abc_sales_rep=
shipping_notes=
notes=
carton_note=
discount=
order_total=24004.00
ship_partial=N
early_ship=N
product_for_resale=N

config/1.0
config_check
section_id=1
country=


spare_items
section_id=3
```

```
spare_items
section_id=4



config/1.0
config_check
section_id=5
country=

line_atr
parent_section_id=1
lla_euser_address_1=sgsver11_address_1
lla_euser_address_2=sgsver11_address_2
lla_euser_address_3=sgsver11_address_3
lla_euser_address_city=sgsver11_city_San Jose
lla_euser_address_country_id=US
lla_euser_address_id=95135
lla_euser_address_postal_code=sgsver11_postal_code_95134
lla_euser_address_state_id=CA
lla_euser_customer_name=sgsver11_customer_name
lla_euser_market_segment=sgsver11_market_segment_Computer Software
sgsver1_1
lla_euser_category=sgsver11_category_is

line_atr
parent_section_id=5
lla_euser_address_1=sgsver12_1_address_1
lla_euser_address_2=sgsver12_1_address_2
lla_euser_address_3=sgsver12_1_address_3
lla_euser_address_city=sgsver12_city_San Jose
lla_euser_address_country_id=US
lla_euser_address_id=95135
lla_euser_address_postal_code=sgs31_postal_code_95134
lla_euser_address_state_id=CA
lla_euser_customer_name=sgsver12_1_customer_name
lla_euser_market_segment=sgsver12_1_market_segment_Computer Software
sgs2_1
lla_euser_category=sgs31_category_is

line_serv_atr
section_id=6
parent_section_id=1
lla_srv_item=sgs_srvver1_itemid
lla_srv_type=24*7 Service
lla_srv_qty=1
lla_srv_list_price=1000.00
lla_srv_cost_price=1000.00
lla_srv_discount=0
lla_srv_site_adr_1=sgs_srvver1_address_adr_1
lla_srv_site_adr_2=sgs_srvver1_address_adr_2
lla_srv_site_adr_3=sgs_srvver1_address_adr_3
lla_srv_site_adr_city=sgs_srvver1_adr_city_santa_ Clara
lla_srv_site_adr_country_id=US
lla_srv_site_adr_id=293839
lla_srv_site_adr_post_code=sgs_srvver1_postcode232909202
```

```
lla_srv_site_adr_state_id=sgs_srvver1_state_id_2322
lla_srv_site_customer_name=sgs_srvver1_customer_name_CUSTOMER3
lla_srv_ctact_id=28328
lla_srv_ctact_first_name=sgs_srvver1_ctact_first_name
lla_srv_ctact_last_name=sgs_srvver1_ctact_last_name
lla_srv_ctact_phone=sgs_srvver1_ctact_phone
lla_srv_ctact_fax=sgs_srvver1_ctact_fax
lla_srv_ctact_email=sgs_srvver1_ctact_email_ehe what is  the E-mail id
lla_srv_ctact_dept=sgs_srvver1_ctact_dept
lla_srv_ctract_quote=sgs_srvver1_ctract_quote_quotationj
lla_srv_ctract_number=sgs_srvver1_ctract_number
lla_srv_ctract_type=sgs_srvver1_ctract_typee
lla_srv_ctract_bill_addr=sgs_srvver1_ctract_addr efjkew addresss
lla_srv_ctract_bill_contact=sgs_srvver1_ctract_bill_contact numerj

line_serv_atr
section_id=7
parent_section_id=5
lla_srv_item=sgs_srvver121_itemid
lla_srv_type=24*7 Service
lla_srv_qty=1
lla_srv_list_price=1000.00
lla_srv_cost_price=1000.00
lla_srv_discount=0
lla_srv_site_adr_1=sgs_srvver121_address_adr_1
lla_srv_site_adr_2=sgs_srvver121_address_adr_2
lla_srv_site_adr_3=sgs_srvver121_address_adr_3
lla_srv_site_adr_city=sgs_srvver121_adr_city_santa_ Clara
lla_srv_site_adr_country_id=US
lla_srv_site_adr_id=2931039
lla_srv_site_adr_post_code=sgs_srvver121_postcode232909202
lla_srv_site_adr_state_id=sgs_srvver121_state_id_2322
lla_srv_site_customer_name=sgs_srvver121_customer_name_CUSTOMER3
lla_srv_ctact_id=28328
lla_srv_ctact_first_name=sgs_srvver121_ctact_first_name
lla_srv_ctact_last_name=sgs_srvver121_ctact_last_name
lla_srv_ctact_phone=sgs_srvver121_ctact_phone
lla_srv_ctact_fax=sgs_srvver121_ctact_fax
lla_srv_ctact_email=sgs_srvver121_ctact_email_ehe what is  the E-mail
id
lla_srv_ctact_dept=sgs_srvver121_ctact_dept
lla_srv_ctract_quote=sgs_srvver121_ctract_quote_quotationj
lla_srv_ctract_number=sgs_srvver121_ctract_number
lla_srv_ctract_type=sgs_srvver121_ctract_typpe
lla_srv_ctract_bill_addr=sgs_srvver121_ctract_addr efjkew addresss
lla_srv_ctract_bill_contact=sgs_srvver121_ctract_bill_contact numerj

lla_po_line_ref=sgsver12322_1_part_lineref

.

submit/2.0
view_order
username=user1
password=xxxxxxxx
email_order_to=yyyyyyyyyy@abc.com
```

```
 sgs_ushirsat_ver21_t5_2011
 .

********************************
 status_api_msg.lst messages



 status/2.0
 change_note
 username=user1
 password=xxxxxxxx
 file_name=/tmp/st_change_note21
 email_status_to=
 order_header=order_status,freight_term,fob,sales_agent,currency,
payment_term,fob,bill_business_name,bill_address1,bill_address2,
bill_address3,bill_city,bill_state,ship_business_name,ship_address1,
bill_fax,bill_city,ship_city,ship_state,original_system_reference,
line_note
 order_detail=product_number,ordered_quantity,promise_date,
new_promise_date
 include_previous=Y
 list_type=QUERY



 ORDER BY t1.po_number;
 status/2.0
 order_note
 username=user1
 password=xxxxxxxx
 file_name=/tmp/order_note21.log
 email_status_to=yyyyyyyyyyyy@abc.com
 order_header=order_status,freight_term,fob,sales_agent,currency,
payment_term,fob,bill_business_name,bill_address1,bill_address2,
bill_address3,bill_city,bill_state,ship_business_name,ship_address1,
bill_fax,bill_city,ship_city,ship_state,original_system_reference,
line_note
 order_detail=line_status, product_number, ordered_quantity, unit_price,
ext_price,promise_date,line_note
 include_previous=Y
 LIST_TYPE=SPECIFIC



 status/2.0
 order_note
 username=user1
 password=xxxxxxxx
 file_name=/tmp/order_note22
 email_status_to=
 order_header=ALL
 order_detail=ALL
 include_previous=Y
 LIST_TYPE=ALL
```

```
.

status/2.0
pod_note
username=user1
password=xxxxxxxx
file_name=/tmp/pod_note21
email_status_to=
pod_list=POD_PONUMBER, RECEIVING_CUSTOMER_NAME, ACTUAL_DELIVERY_DATE
include_previous=Y
list_type=QUERY


status/2.0
shipment_note
username=user1
password=xxxxxxxx
file_name=/tmp/st_ship_note_21.dat
email_status_to=
order_header=ORDER_NUMBER, ORIGINAL_SYSTEM_REFERENCE, PAYMENT_TERM,
SHIP_METHOD
order_detail=MAJOR_LINE_NUMBER, PRODUCT_NUMBER, ORDERED_QUANTITY
ship_header=SHIP_SET_NUMBER, SHIPPED_DATE, BATCH_NAME, TRACKING_NUMBER
ship_detail=LINE_UNIT, LINE_SHIP_QTY, LINE_BO_QTY
ship_carton=CARTON_ID, SERIAL_NUMBER
pod_list=RECEIVING_CUSTOMER_NAME, ACTUAL_DELIVERY_DATE
include_previous=Y
list_type=ALL

.

*******************************************
adm_api_msg.lst messages

adm_list_parameters.2
adm_run_diagnostic.2
adm_set_parameter.2
adm_validate_user.2

admin/2.0
list_parameters
username=user1
password=xxxxxxxx
list_type=ALL

.
admin/2.0
run_diagnostic
username=user1
password=xxxxxxxx
diagnostic=SHOW_PARAMETERS

.
admin/2.0
```

```
set_parameter
username=user1
password=xxxxxxxx

master_host      zzzzzzz.abc.com
.
admin/2.0
validate_user
username=user1
password=xxxxxxxx

.

***********************************
  zeroprice_api_msg.lst messages

  zp_define21
  zp_delete21
  zp_list21
  zerop/2.0
  define_rule
  username=user1
  password=xxxxxxxx

  .
  zerop/2.0
  delete_rule
  username=user1
  password=xxxxxxxx


  .
  zerop/2.0
  list_rules
  username=user1
  password=xxxxxxxx
  list_type=ALL
  configurable=ABC2515-CH


.
```

What is claimed is:

1. In an order server, a method for processing order messages, comprising the steps of:

receiving a first message of the order messages over a network, the first message comprising a first document organized in a first predefined format;

wherein the first predefined format defines a configuration element;

obtaining a first data set from the first message based on the first predefined format of the first document in response to receiving the first message;

wherein the first data set identifies, based on the configuration element, one or more tasks related to the configuration of a product for a customer;

invoking an ordering function to process the one or more tasks related to the configuration of the product;

generating a second data set by processing the one or more tasks related to the configuration of the product in response to invoking the ordering function;

providing over the network the second data set in a second message comprising a second document organized in a second predefined format suitable for use by an ordering application.

2. The method of claim 1, wherein the order server is a vendor order server and the ordering application is a customer ordering application; and wherein:

the step of receiving the first message comprises receiving a first extended markup language document from the customer ordering application;

the step of obtaining the first data set comprises obtaining the first data set from a first predefined element of the first extended markup language document;

the step of obtaining the second data set comprises invoking an ordering function based on a message type defined in a second predefined element of the first extended markup language document to generate the second data set; and the step of providing the second data set comprises providing the second data set in a third predefined element in a second extended markup language document to the customer ordering application.

3. The method of claim 1, wherein the step of receiving the first message comprises directing the first message to a first message processing module of a plurality of message processing modules.

4. The method of claim 3, wherein the step of directing the first message comprises parsing the first message to determine a message type that identifies an ordering function for the first message, and directing the first message to the first processing module based on the message type.

5. The method of claim 4 further comprising identifying, in a previously received transaction, the second predetermined format indicative of the order response type.

6. The method of claim 1, wherein the step of obtaining the second data set comprises:

identifying the message type based on a corresponding transaction previously received;

interacting with an order database based on the first data set and based on a message type of the first message to generate the second data set.

7. The method of claim 6, wherein the step of obtaining the second data set comprises performing an ordering function based on the first data set and based on a message type of the first message to generate the second data set.

8. The method of claim 7, wherein the second predefined format is suitable for integration into a database maintained by the ordering application.

9. The method of claim 8, wherein the first document and the second document are extended markup language documents.

10. An order server for processing order messages, the order server comprising:

a memory;

an input/output interface in communication with the memory; and a processor in communication with the memory and the input/output interface, wherein the memory is encoded with logic instructions for an order message manager application that, when performed on the processor, cause the processor to form an order message manager that processes order messages by performing the operations of:

receiving through the input/output interface a first message of the order messages over a network, the first message comprising a first document organized in a first predefined format;

wherein the first predefined format defines a configuration element;

obtaining a first data set from the first message based on the first predefined format of the first document in response to receiving the first message;

wherein the first data set identifies, based on the configuration element, one or more tasks related to the configuration of a product for a customer;

obtaining a second data set by processing the one or more tasks related to the configuration of the product in response to the step of obtaining the first data set; and providing through the input/output interface over the network the second data set in a second message comprising a second document organized in a second predefined format suitable for use by an ordering application.

11. The order server of claim 10, wherein the order server is a vendor order server and the ordering application is a customer ordering application; and wherein the logic instructions for the order message manager application comprise further logic instructions, that, when performed on the processor, cause the order message manager to perform the operations of:

receiving a first extended markup language document from the customer ordering application;

obtaining the first data set from a first predefined element of the first extended markup language document;

invoking an ordering function based on a message type defined in a second predefined element of the first extended markup language document to generate the second data set;

and providing the second data set in a third predefined element in a second extended markup language document to the customer ordering application.

12. The order server of claim 10, wherein the logic instructions for the order message manager application comprise further logic instructions, that, when performed on the processor, cause the order message manager to perform the operation of directing the first message to a first message processing module of a plurality of message processing modules.

13. The order server of claim 12, wherein the logic instructions for the order message manager application comprise further logic instructions, that, when performed on the processor, cause the order message manager to perform the operation of parsing the first message to determine a message type that identifies an ordering function for the first message, and directing the first message to the first processing module based on the message type.

14. The order server of claim 10, wherein the logic instructions for the order message manager application comprise further logic instructions, that, when performed on the processor, cause the order message manager to perform the operation of interacting with an order database based on the first data set and based on a message type of the first message to generate the second data set.

15. The order server of claim 10, wherein the logic instructions for the order message manager application comprise further logic instructions, that, when performed on the processor, cause the order message manager to perform the operation of performing an ordering function based on the first data set and based on a message type of the first message to generate the second data set.

16. The order server of claim 10, wherein the second predefined format is suitable for integration into a database maintained by the ordering application.

17. The order server of claim 16, wherein the first document and the second document are extended markup language documents.

18. A non-transitory computer-readable medium storing instructions, which, when executed by one or more processors, cause one or more computing devices to perform operations comprising:

receiving a first message of a set of order messages over a network, the first message comprising a first document organized in a first predefined format;

wherein the first predefined format defines a configuration element;

obtaining a first data set from the first message based on the first predefined format of the first document in response to receiving the first message;

wherein the first data set identifies, based on the configuration element, one or more tasks related to the configuration of a product for a customer;

invoking an ordering function to process the one or more tasks related to the configuration of the product;

generating a second data set by processing the one or more tasks related to the configuration of the product in response to invoking the ordering function;

providing over the network the second data set in a second message comprising a second document organized in a second predefined format suitable for use by an ordering application.

19. The non-transitory computer-readable medium of claim 18, wherein the order server is a vendor order server and the ordering application is a customer ordering application; and wherein:

instructions for receiving the first message comprise instructions for receiving a first extended markup language document from the customer ordering application;

instructions for obtaining the first data set comprise instructions for obtaining the first data set from a first predefined element of the first extended markup language document;

instructions for obtaining the second data set comprise instructions for invoking an ordering function based on a message type defined in a second predefined element of the first extended markup language document to generate the second data set; and instructions for providing the second data set comprise instructions for providing the second data set in a third predefined element in a second extended markup language document to the customer ordering application.

20. The non-transitory computer-readable medium of claim 18, wherein instructions for receiving the first message comprise instructions for directing the first message to a first message processing module of a plurality of message processing modules and wherein instructions for directing the first message comprise instructions for parsing the first message to determine a message type that identifies an ordering function for the first message, and directing the first message to the first processing module based on the message type.

21. The non-transitory computer-readable medium of claim 18, wherein the first document and the second document are extended markup language documents.

* * * * *